US012521623B2

(12) United States Patent
Okuyama et al.

(10) Patent No.: US 12,521,623 B2
(45) Date of Patent: Jan. 13, 2026

(54) INPUTTING DEVICE

(71) Applicant: Sony Interactive Entertainment Inc., Tokyo (JP)

(72) Inventors: Isao Okuyama, Tokyo (JP); Takeshi Igarashi, Tokyo (JP); Takeshi Toyoshima, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/575,063

(22) Filed: Jan. 13, 2022

(65) Prior Publication Data
US 2022/0305374 A1 Sep. 29, 2022

(30) Foreign Application Priority Data
Mar. 25, 2021 (JP) .................. 2021-052376

(51) Int. Cl.
*A63F 13/24* (2014.01)
*A63F 13/285* (2014.01)
(52) U.S. Cl.
CPC ............ *A63F 13/24* (2014.09); *A63F 13/285* (2014.09)
(58) Field of Classification Search
None
See application file for complete search history.

(56) References Cited

U.S. PATENT DOCUMENTS 5,982,354 A  11/1999 Arita
6,198,471 B1* 3/2001 Cook ..................... G06F 3/0362
345/161
10,447,265 B1 10/2019 Tompkins
10,471,344 B2 11/2019 Nokuo
10,537,795 B2  1/2020 Bristol
11,112,932 B2  9/2021 Powderly
2011/0316770 A1 12/2011 Yano
(Continued)

FOREIGN PATENT DOCUMENTS

CN       110573993 A    12/2019
JP        10232737 A     9/1998
(Continued)

OTHER PUBLICATIONS

Oculus Quest 2 Controller Partial Teardown published by King Matai to youtube (https://www.youtube.com/watch?v=vrYdLEpRSLY) on Feb. 17, 2021 (Year: 2021).*

(Continued)

*Primary Examiner* — Peter J Iannuzzi
(74) *Attorney, Agent, or Firm* — Kilpatrick Townsend & Stockton LLP

(57) ABSTRACT

Provided is an inputting device including an operation portion and a grip. The operation portion includes a first operation button and a first circuit board arranged along a first plane. The grip includes a second circuit board arranged in a rear with respect to the first circuit board and arranged obliquely with respect to the first plane and extends obliquely rearwardly from the operation portion. In the inputting device, a front end of the second circuit board is arranged lower than the first circuit board, and at least one of a vibration motor and a battery is arranged on an upper side of the second circuit board and is accommodated in the grip.

12 Claims, 13 Drawing Sheets

(56) References Cited

U.S. PATENT DOCUMENTS

| | | | |
|---|---|---|---|
| 2016/0062489 A1* | 3/2016 | Li | G06F 3/017 345/163 |
| 2016/0364910 A1 | 12/2016 | Higgins | |
| 2017/0189799 A1 | 7/2017 | Anderson | |
| 2017/0354871 A1* | 12/2017 | Okamura | A63F 13/24 |
| 2017/0354873 A1* | 12/2017 | Nokuo | A63F 13/213 |
| 2018/0311575 A1 | 11/2018 | Bristol | |
| 2018/0314406 A1* | 11/2018 | Powderly | G06F 3/02 |

FOREIGN PATENT DOCUMENTS

| | | | |
|---|---|---|---|
| JP | 2010063977 A | 3/2010 | |
| JP | 2011086287 A | 4/2011 | |
| JP | 2014186740 A | 10/2014 | |
| JP | 2017220421 A | 12/2017 | |
| JP | 2018033049 A | 3/2018 | |
| JP | 2020518902 A | 6/2020 | |

OTHER PUBLICATIONS

How Does a Linear Resonant Actuator Work? by Shantanu Bala published Oct. 2016 by Texas Instruments (Year: 2016).*

Quest 2 Controller Disassembly Guide posted to (https://www.reddit.com/r/OculusQuest/comments/12heek/quest_2_controller_disassembly_guide/) by tmakaro on Friday Jan. 22, 2021 (Year: 2021).*

Notice of Reasons for Refusal for corresponding JP Application No. 2021-052376, 6 pages, dated Feb. 24, 2023.

The First Office Action for corresponding CN Application No. 202210305434.7, 14 pages, dated Jun. 5, 2024.

Ziyou Cai, "Oculus Quest 2, handle disassembly tutorial", https://www.bilibili.com/read/cv9562873/, 46 pages, Jan. 31, 2021 (for relevancy see Non-Pat. Lit. #1).

* cited by examiner

INPUTTING DEVICE

CROSS REFERENCE TO RELATED APPLICATION

This application claims the benefit of Japanese Priority Patent Application JP 2021-052376 filed Mar. 25, 2021, the entire contents of which are incorporated herein by reference.

BACKGROUND

The present disclosure relates to an inputting device.

An inputting device for a game that is operated with one hand by a user is disclosed in Japanese Patent Laid-open No. 2011-86287. The inputting device includes a grip and an operation portion located at an upper portion of the grip. A plurality of operation buttons are arranged on the operation portion. A spherical light emitting portion is arranged further above the operation portion. Meanwhile, as an inputting device for a game that is operated with one hand, an inputting device that includes a vibration motor provided in a grip is disclosed in Japanese Patent Laid-open No. 2014-186740.

SUMMARY

Such an inputting device as just described includes a vibration motor described above and a battery as parts of a relatively large size. A layout of such large parts as just described is a subject.

The inputting device according to an embodiment of the present disclosure includes an operation portion and a grip that extends obliquely rearwardly from the operation portion. The operation portion includes an operation button and a first circuit board arranged along a first plane. The grip includes a second circuit board arranged in a rear with respect to the first circuit board and arranged obliquely with respect to the first plane. A front end of the second circuit board is arranged lower than the first circuit board. At least one of a vibration motor and a battery is arranged on an upper side of the second circuit board and is accommodated in the grip.

With the inputting device, any of the vibration motor and the battery both having a large size can be arranged on the upper side of the second circuit board. Thus, it is possible to adopt a vibration motor having high output power or adopt a battery having a large battery capacity. Further, a great space can be reserved in front of the second circuit board and below the first circuit board, and various parts can be arranged also in the space.

DETAILED DESCRIPTION OF THE PREFERRED EMBODIMENT

In the following, an example of the inputting device according to the embodiment of the present disclosure is described. In the present specification, directions indicated by Y1 and Y2 of FIG. 2A denote forward and rearward directions, respectively, and directions indicated by X1 and X2 in FIG. 2A denote rightward and leftward directions, respectively. Further, directions indicated by Z1 and Z2 in FIG. 2B denote upward and downward directions, respectively. The directions mentioned correspond to directions as viewed from a user who grasps an inputting device 100. Further, in FIGS. 2A to 2D, a black round mark represents a light emitting portion H described later.

[Overview of System]

Figure 1:
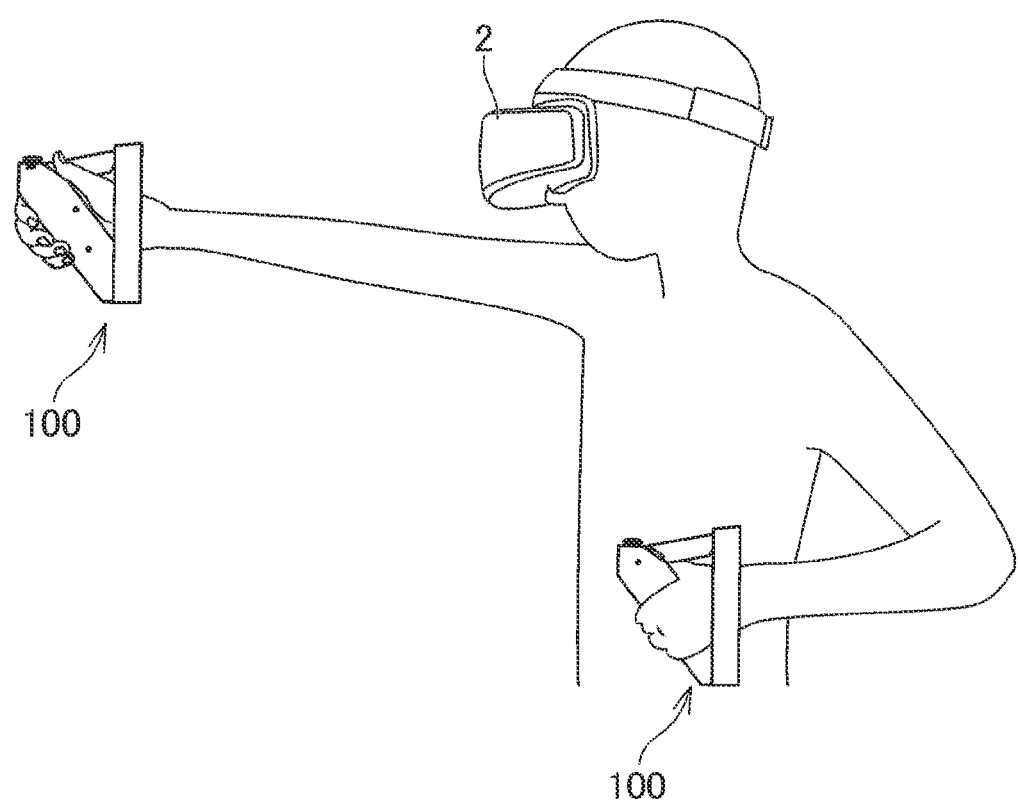
FIG. 1 is a view illustrating an example of a system in which an inputting device according to an embodiment of the present disclosure is used.

As depicted in FIG. 1, the inputting device 100 is used, for example, together with a head-mounted display (HMD) 2. A user will wear the HMD 2 on the head and hold the inputting device 100 in the right hand and/or the left hand. The HMD 2 includes a camera that is directed forwardly. On an outer face of the inputting device 100, a plurality of light emitting portions H for tracking are provided. The light emitting portions H are detected by the camera of the HMD 2. The position and the posture of the inputting device 100 (namely, the position and the orientation of a hand of the user) are calculated on the basis of the positions of the detected light emitting portions H (tracking). The inputting device 100 has a plurality of operation members that are operated by fingers of the user (for example, operation buttons, an operation stick, and so forth) as described later. On a display unit of the HMD 2, a moving image (for example, a game image) generated on the basis of the position and the posture of the inputting device 100 and an operation performed for the operation members is displayed.

Calculation of the position and the posture of the inputting device 100 may be executed by an information processing device incorporated in the HMD 2 or may be executed by an external information processing device (for example, a game device separate from the HMD 2 or a personal computer). The inputting device 100 may include a motion sensor (for example, an acceleration sensor or a gyro sensor). The information processing device may calculate the position and the posture of the inputting device 100 not only on the basis of the position of the light emitting portions H but also on the basis of output of the motion sensor. Also generation of a moving image may be executed by the information processing device incorporated in the HMD 2 or may be executed by an external information processing device. In a case where calculation of the position and so forth of the inputting device 100 and generation of a moving image are executed by an external information processing device, image information captured by the camera is transmitted to the external information processing device by wireless or wired transmission. Moving image information generated by the external information processing device is transmitted from the external information processing device to the HMD 2 by wireless or wired transmission.

The inputting device 100 may include a microphone, a speaker, and so forth. Further, the inputting device 100 may have, on an outer face thereof, a light emitting portion that is not used for tracking of the position or the posture, for example, a light emitting portion indicative of an operation state of the inputting device 100 and a light emitting portion for identifying a plurality of inputting devices 100.

[General Configuration of Inputting Device]

In the following, the inputting device 100 for the right hand is described as an example. The external shape of the inputting device 100 for the right hand and the external shape of the inputting device 100 for the left hand may be substantially left-right symmetrical with each other. Accordingly, the description regarding the relative positions of the elements (members and portions) of the inputting device 100 for the right hand is applicable also to the inputting device 100 for the left hand by inverting the "rightward," "right side," "leftward," and "left side" used in the description. The number and types of the operation members that are operated with the fingers of a user may be different between the left and right inputting devices 100. Further, the arrangement of the operation members may not be left-right symmetrical between the inputting device 100 for the right hand and the inputting device 100 for the left hand.

Figure 2A:
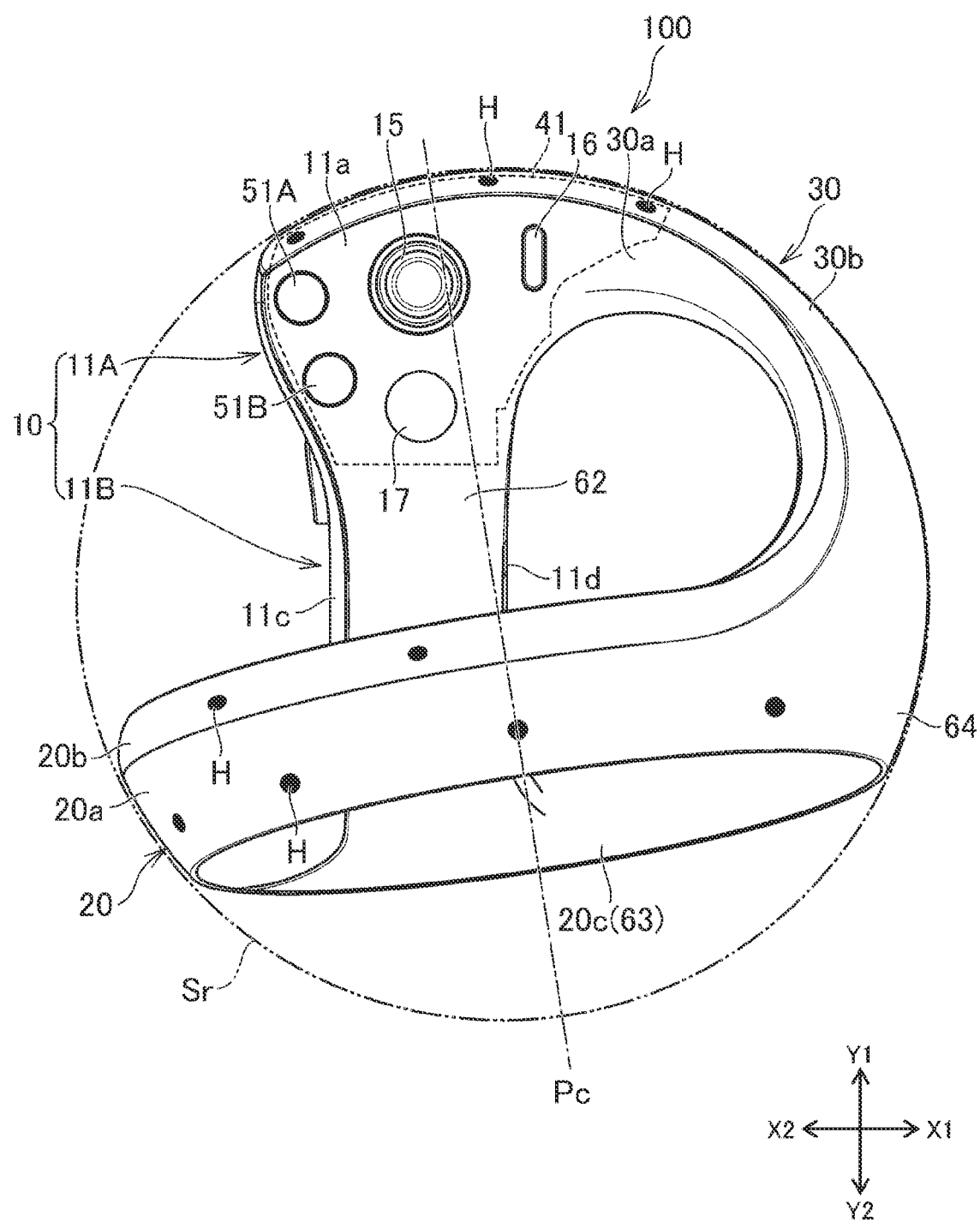
FIG. 2A is a top plan view depicting an example of the inputting device according to the embodiment of the present disclosure.
Figure 2B:
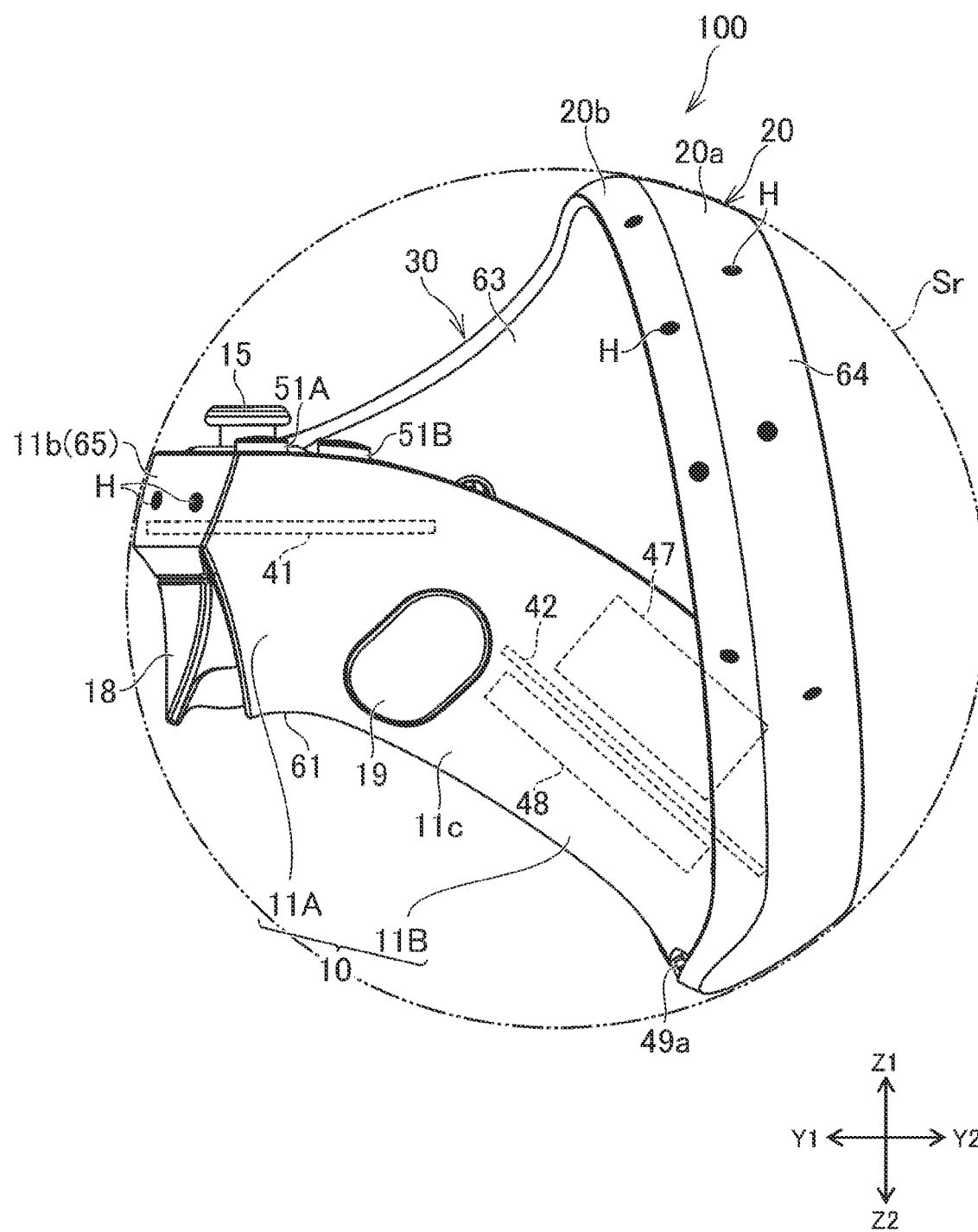
FIG. 2B is a left side elevational view of the inputting device.

As depicted in FIGS. 2A and 2B, a main body 10 of the inputting device 100 includes a grip 11B for being grasped by a user and an operation portion 11A on which a plurality of operation members are arranged. The main body 10 has the operation portion 11A at an upper portion thereof. As hereinafter described, a light emitting portion H (refer to FIG. 2D) may be provided on the operation portion 11A. The grip 11B extends obliquely downwardly and rearwardly from the operation portion 11A.

[Operation Member]

As depicted in FIG. 2A, for example, operation buttons 51A and 51B are arranged on the operation portion 11A. The two operation buttons 51A and 51B of the operation portion 11A are buttons for selecting and operating, for example, a character or an object of a game. The operation buttons 51A and 51B are arranged on an upper face 11a of the operation portion 11A and are operated, for example, by the thumb. The structure of the operation buttons 51A and 51B is hereinafter described in detail.

As depicted in FIG. 2A, on the operation portion 11A, an operation stick 15 and operation buttons 16 and 17 may further be arranged. The operation stick 15 is an operation member that can be tilted in a diametrical direction or slidably moved in a diametrical direction. The operation button 16 is a functional button for sharing a game play with a different user, and is used to capture a game screen image while a game is in progress or to capture a still image during reproduction of a moving image and then store the captured image into the HMD 2 or a server apparatus connected to the HMD 2. The operation button 17 is a button for displaying, for example, various functions that can be selected by a user. For example, operating the operation button 17 allows the user to select a game application to be played from among a plurality of game applications in the middle of progress.

As depicted in FIG. 2B, a trigger button 18 may be arranged below a front face 11b of the operation portion 11A. The main body 10 may include a trigger driving device 45 (refer to FIG. 5A) for moving the trigger button 18. The trigger driving device 45 generates, for example, when the trigger button 18 is pressed, reactive force against the movement of the trigger button 18.

As depicted in FIG. 2B, the main body 10 may include an operation button 19 on the grip 11B. The operation button 19 may be provided on a left side face 11c of the grip 11B. The inputting device 100 is a device for the right hand, and the operation button 19 may be provided, for example, on the left side face 11c of the grip 11B. According to this arrangement of the operation button 19, the user can operate the operation button 19 with the middle finger.

As depicted in FIG. 2A, the operation buttons 51A and 51B and the operation button 16 may be arranged on the opposite sides across the operation stick 15. For example, the operation buttons 51A and 51B may be arranged on the left side with respect to the operation stick 15, and the operation button 16 may be arranged on the right side with respect to the operation stick 15. According to this arrangement, the user can set the initial position of the thumb on the operation stick 15 and can smoothly move the thumb from the operation stick 15 to any of the operation buttons 51A and 51B and the operation button 16 as occasion demands. The operation button 17 may be arranged in the rear of the operation stick 15.

[Overview of Ring-Shaped Portion]

Figure 2C:
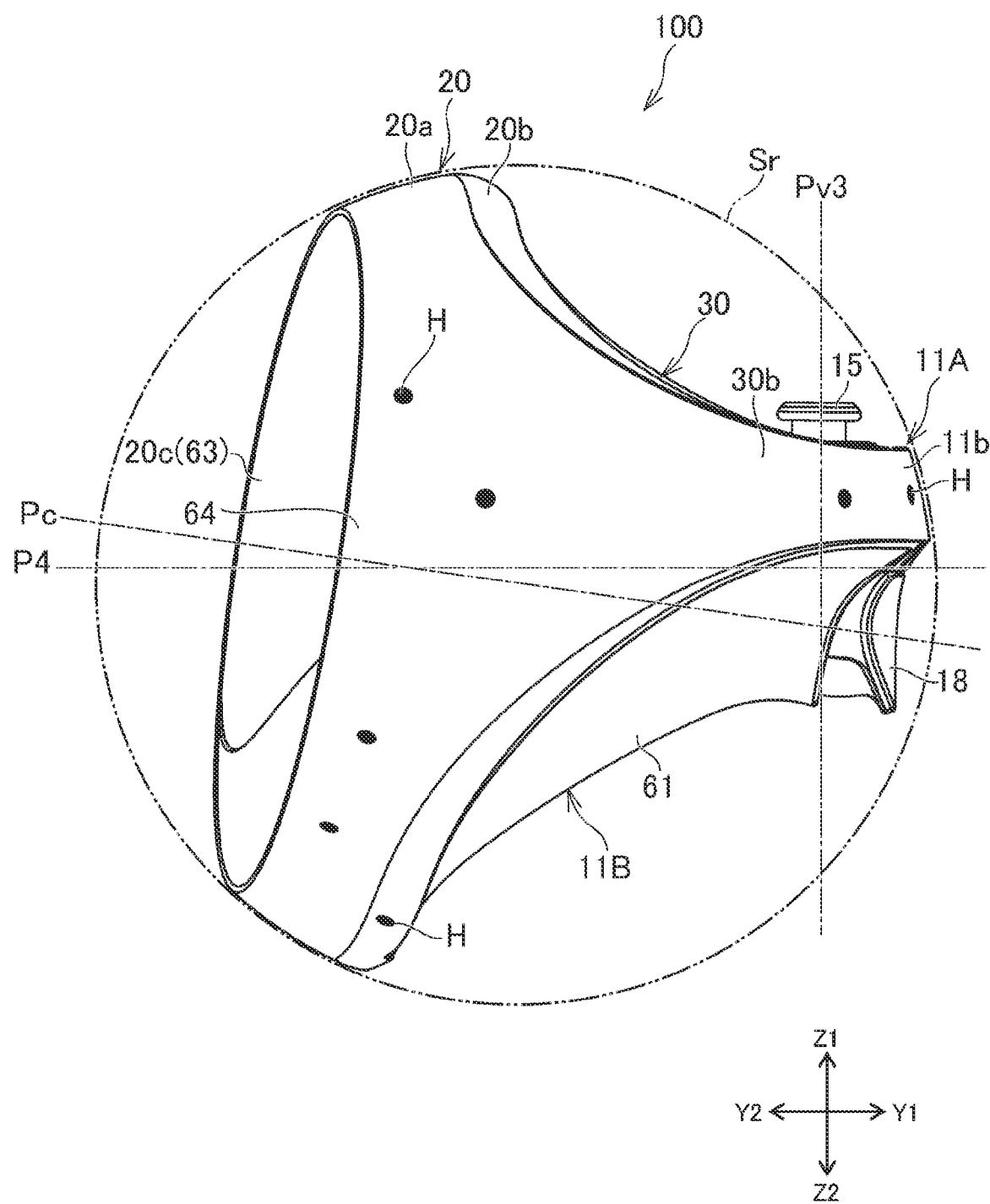
FIG. 2C is a right side elevational view of the inputting device.
Figure 2D:
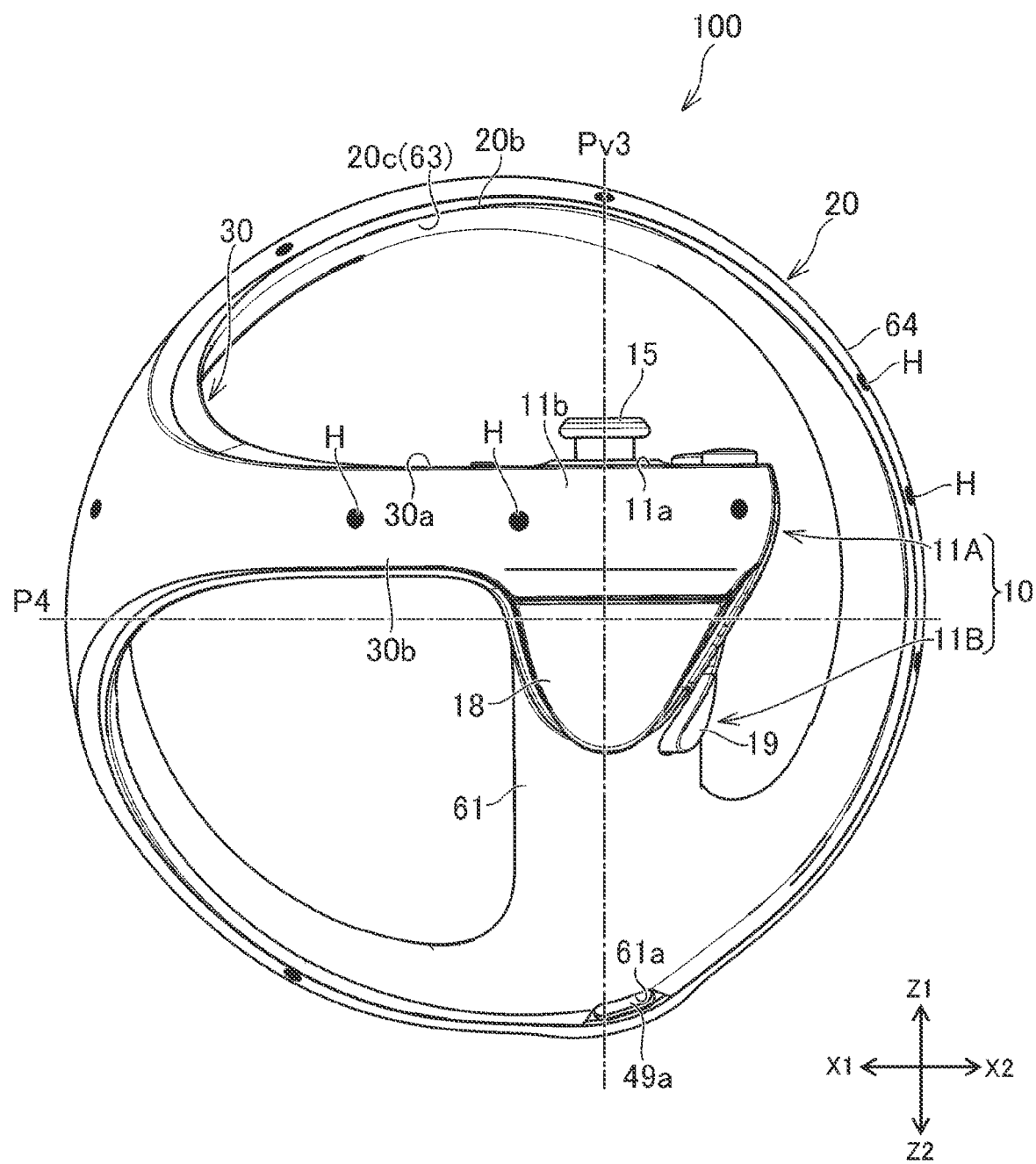
FIG. 2D is a front elevational view of the inputting device.

As depicted in FIGS. 2A and 2D, the inputting device 100 may have a ring-shaped portion 20 at a rear portion thereof. A plurality of light emitting portions H are provided also on the ring-shaped portion 20. The ring-shaped portion 20 is formed so as to surround the main body 10 as viewed in rear elevation of the inputting device 100. The ring-shaped portion 20 is connected at a lowermost portion thereof to a lowermost portion (rearmost portion) of the grip 11B. The ring-shaped portion 20 has a ring shape centered at a center line Pc (FIGS. 2A and 2C). In the example depicted in FIGS. 2A to 2D, the ring-shaped portion 20 is formed over 360 degrees in a direction of a circumference centered at the center line Pc. When the inputting device 100 is to be used, the user will pass his/her hand through the ring-shaped portion 20 and grasp the grip 11B.

It is to be noted that the inputting device 100 may have, at a rear portion thereof, a curved portion (arcuate portion) that covers only an upper portion of the main body 10 as viewed in rear elevation of the inputting device 100, in place of the ring-shaped portion 20. Further, as another example, the inputting device 100 may have, at a rear portion thereof, a portion having a polygonal shape that surrounds the main body 10 as viewed in rear elevation of the inputting device 100, in place of the ring-shaped portion 20.

[Overview of Side Portion]

As depicted in FIG. 2A, the inputting device 100 may have a side portion 30. The side portion 30 extends from the operation portion 11A toward the ring-shaped portion 20 and is connected to the ring-shaped portion 20. In particular, as depicted in FIG. 2A, the side portion 30 extends rightwardly from the operation portion 11A and is curved such that it further extends rearwardly. Further, the side portion 30 is connected to a side portion of the ring-shaped portion 20 (in the example depicted in FIG. 2A, to a right portion of the ring-shaped portion 20). A light emitting portion H is provided also on a front face 30b of the side portion 30.

As depicted in FIG. 2D, an upper face 30a of a front portion of the side portion 30 and the upper face 11a of the operation portion 11A may extend substantially in parallel to a horizontal plane P4. Accordingly, the user can easily move a finger leftwardly and rightwardly on the upper face 11a of the operation portion 11A. The horizontal plane P4 is, for example, a plane perpendicular to a center line Pv3 of the operation stick 15.

[Internal Structure of Main Body]

Figure 3:
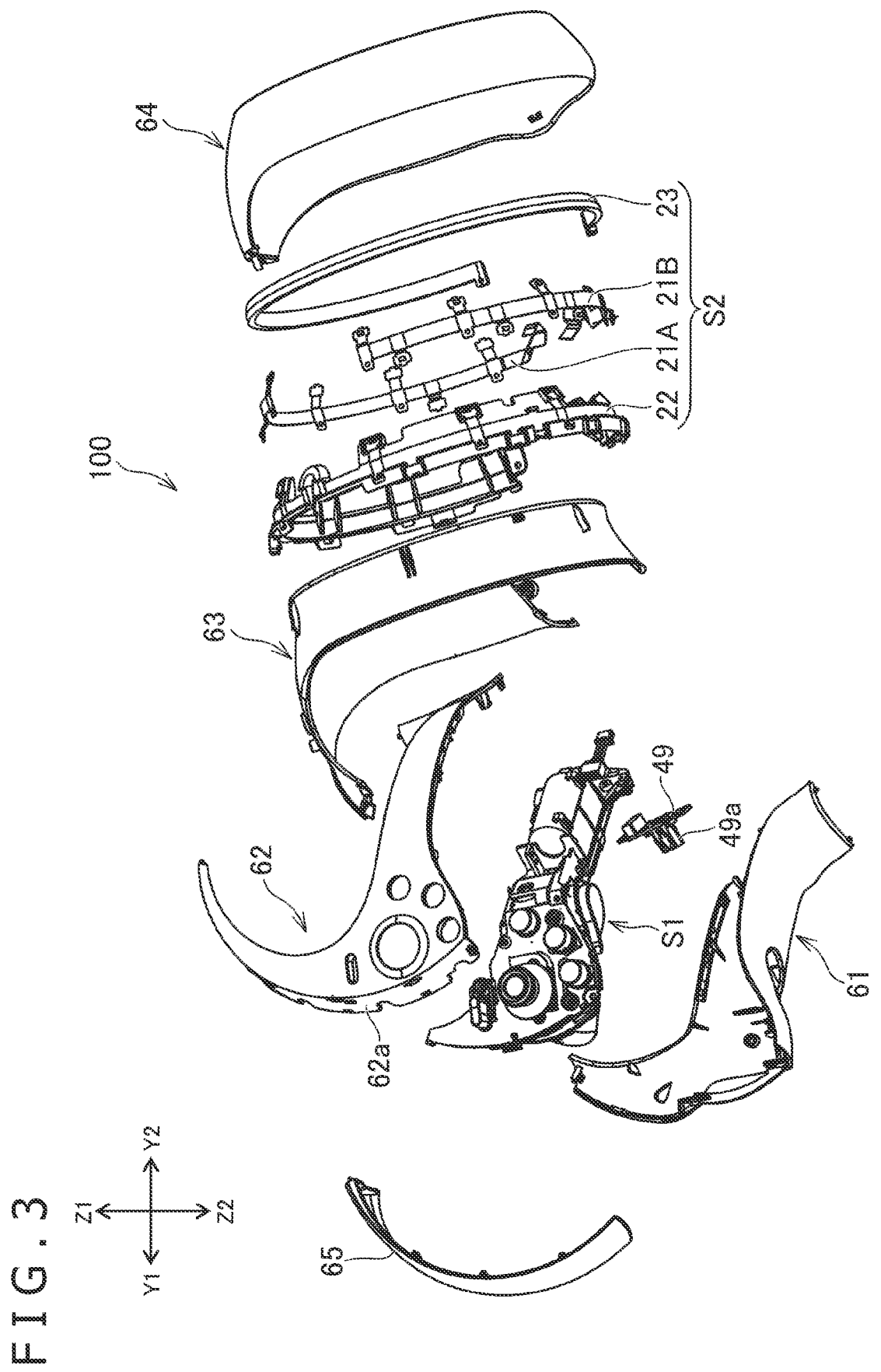
FIG. 3 is an exploded perspective view of the inputting device.

As depicted in FIG. 3, the main body 10 (operation portion 11A and grip 11B) has an internal structure S1. The internal structure S1 is accommodated in exterior members 61 and 62 that configure an outer face of the main body 10. The exterior member 61 covers the lower side of the internal structure S1, and the exterior member 62 covers the upper side of the internal structure S1.

Figure 7:
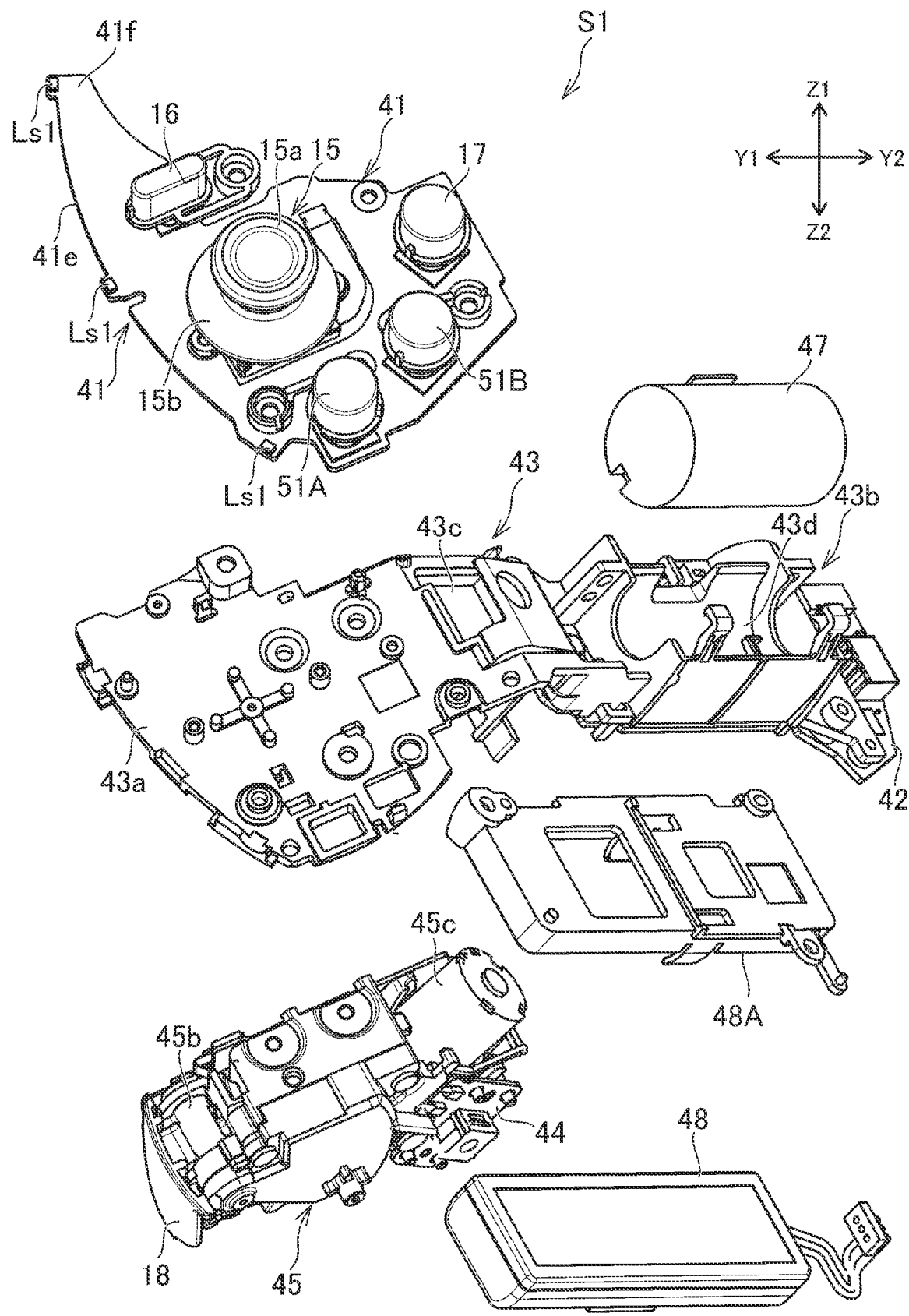
FIG. 7 is an exploded perspective view of the internal structure.

As depicted in FIG. 7, the internal structure S1 includes a first circuit board 41, a second circuit board 42 arranged in the rear of the first circuit board 41, and a body frame 43 to which the circuit boards 41 and 42 are attached. Each of the circuit boards 41 and 42 is a rigid board. The rigid board has, for example, glass epoxy resin as a base material thereof. The first circuit board 41 is arranged on the operation portion 11A. The first circuit board 41 has mounted thereon switches and sensors for detecting movement of the operation members (operation of the user) the inputting device 100 has. The second circuit board 42 is located on the grip 11B.

Figure 5A:
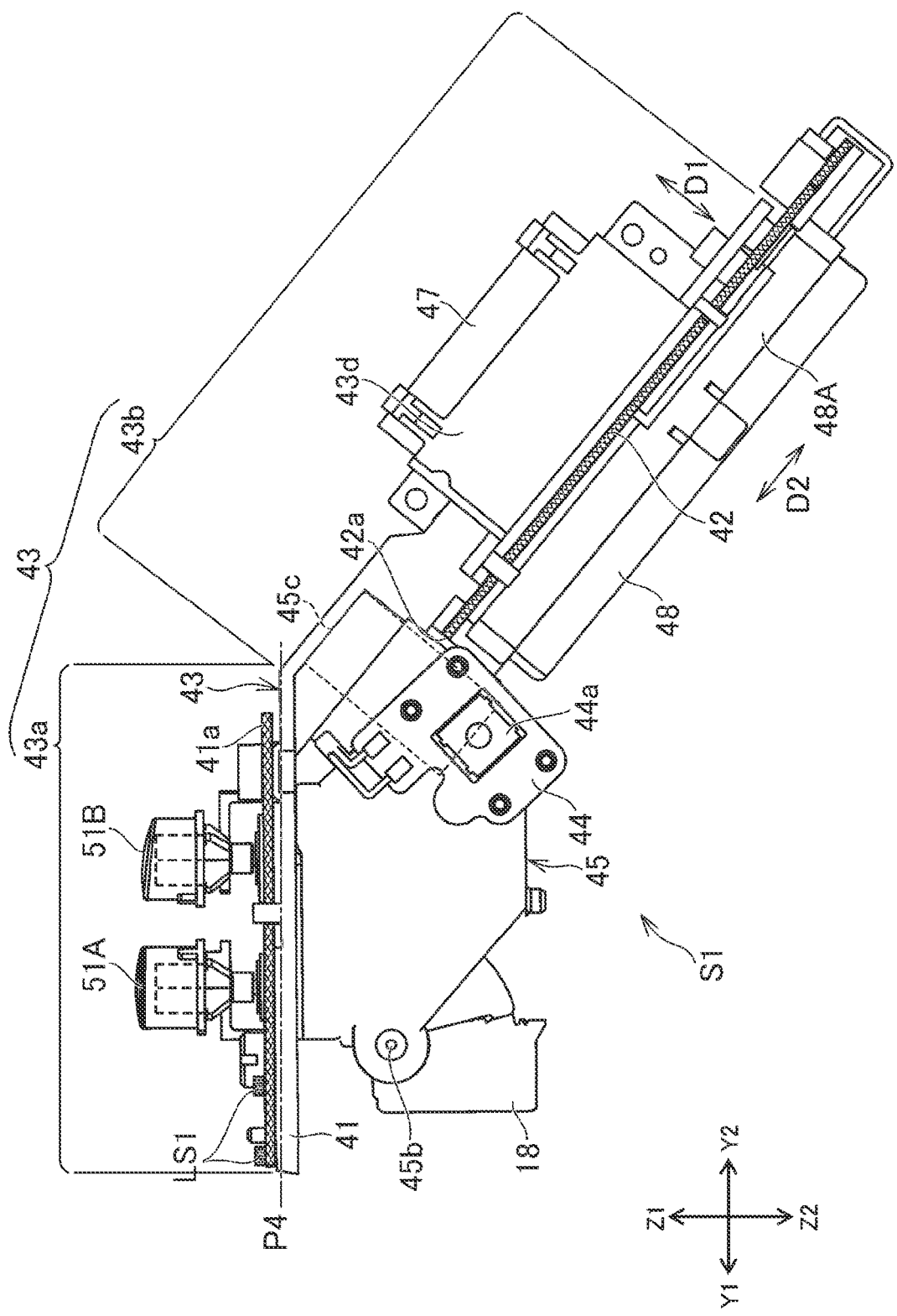
FIG. 5A is a left side elevational view of an internal structure accommodated in a main body of the inputting device, in which an operation stick depicted in FIG. 7 is omitted.

As depicted in FIG. 5A, the first circuit board 41 may be arranged along the horizontal plane P4. (In FIG. 5A, the first circuit board 41 is indicated by hatching.). The horizontal plane P4 is, for example, a horizontal plane orthogonal to the center line Pv3 (refer to FIG. 2D) of the operation stick 15. On the other hand, the second circuit board 42 is arranged obliquely with respect to the horizontal plane P4. (In FIG. 5A, also the second circuit board 42 is indicated by hatching.). A front edge (upper edge) 42a of the second circuit board 42 is located lower than a rear edge 41a of the first circuit board 41. In the example depicted in FIG. 5A, the front edge (upper edge) 42a of the second circuit board 42 is located lower than a support shaft 45b for the trigger button 18. In this layout, since the front edge (upper edge) 42a of the second circuit board 42 is located low, the space that is formed on the upper side of the second circuit board 42 and in the inside of the grip 11B can be made greater as much. In this space, a relatively large part or parts such as a battery 48 and a vibration motor 47 can be arranged.

As depicted in FIG. 5A, it may be preferred that the battery 48 and the vibration motor 47 be arranged on the opposite sides across the second circuit board 42. This arrangement makes it easy to reserve a size for the battery 48 and the vibration motor 47. In the example depicted in FIG. 5A, the vibration motor 47 is arranged on the upper side of the second circuit board 42. Consequently, it becomes easy to adopt a motor of high output power as the vibration motor 47. As the vibration motor 47, for example, a voice coil motor, a direct current motor having a weight whose center of gravity is displaced from the center of rotation of the motor, or the like may be used.

The vibration motor 47 is held by a holder 43d (refer to FIG. 7) formed on the body frame 43 and is located in the inside of the grip 11B. The vibration motor 47 may be in contact with an inner face of the exterior member 62 (refer to FIG. 3) that configures the grip 11B with a cushion (not depicted) interposed therebetween. This configuration makes it easy to transmit vibration generated by driving of the vibration motor 47 to the palm of a hand of the user. A rear portion 43b of the body frame 43 is located on the upper side of the second circuit board 42. The holder 43d is formed at the rear portion 43b of the body frame 43.

As depicted in FIG. 5A, the battery 48 is arranged on the lower side of the second circuit board 42. The internal structure S1 may include a battery case 48A. The battery case 48A is fixed to the rear portion 43b of the body frame 43 and the second circuit board 42, and the battery 48 may be held by the battery case 48A.

As depicted in FIG. 5A, the battery 48 is smaller than the vibration motor 47 in size in a direction perpendicular to the second circuit board 42 (direction indicated by an arrow mark D1 in FIG. 5A). The battery 48 is greater than the vibration motor 47 in size in a direction along the second circuit board 42 (direction indicated by an arrow mark D2 in FIG. 5A). According to such an arrangement of the second circuit board 42, the battery 48, and the vibration motor 47 as just described, while the vibration motor 47 of a large size is adopted, it is also possible to adopt a battery of a large capacity for the battery 48.

It is to be noted that the arrangement of the battery 48 and the vibration motor 47 may be different from that in the example depicted in FIG. 5A. For example, the battery 48 may be arranged on the upper side of the second circuit board 42 while the vibration motor 47 is arranged on the lower side of the second circuit board 42. As a further example, both the battery 48 and the vibration motor 47 may be arranged on the upper side of the second circuit board 42.

Also the arrangement of the circuit boards 41 and 42 is not limited to that in the example depicted in FIG. 5A. For example, the first circuit board 41 may be inclined such that it is higher on the front side thereof. In this case, the second circuit board 42 may be inclined more steeply than the first circuit board 41.

As depicted in FIGS. 2B and 2D, a connector 49a is provided at a lowermost portion of the grip 11B such that it is directed forwardly. An opening 61a is formed in the exterior member 61 such that it is open forwardly. The connector 49a is exposed forwardly through the opening 61a. The inputting device 100 may include a lid for closing up the opening 61a. The connector 49a is a connector, for example, for charging the battery 48. The user can use the inputting device 100 in a state in which a charging cable is connected to the connector 49a. As depicted in FIG. 3, the inputting device 100 may include a board 49 on which the connector 49a is mounted.

As depicted in FIG. 5A, the front edge (upper edge) 42a of the second circuit board 42 is positioned in the rear with respect to the rear edge 41a of the first circuit board 41. This makes it possible to arrange a relatively large part on the front side of the front edge 42a of the second circuit board 42.

In the example depicted in FIG. 5A, the trigger button (operation button) 18 and the trigger driving device 45 are arranged below the first circuit board 41. The trigger driving device 45 has a movable portion 45a that is located on the rear side of the trigger button 18 and that is movable forwardly and rearwardly with respect to the support shaft 45b. The trigger driving device 45 moves the trigger button 18 through the movable portion 45a.

For example, when the trigger button 18 is pressed, the trigger driving device 45 applies reactive force to the trigger button 18 through the movable portion 45a thereof. This makes it possible, for example, for a user to have such a sense that a character being operated in a game space by the user pushes or pulls a hard thing. The trigger button 18 and the trigger driving device 45 are located in front of the front edge (upper edge) 42a of the second circuit board 42. An operation member arranged below the first circuit board 41 may not be the trigger button 18 that moves around the support shaft 45b but may be an operation button that translates in the forward and rearward direction. Also in this case, a driving device for applying reactive force to this operation button may be arranged in the rear of the operation button.

As depicted in FIG. 5A, the trigger driving device 45 is located below a front portion 43a of the body frame 43. The trigger driving device 45 may be attached to the body frame 43. The body frame 43 may have formed therein an opening, a notch, or a recessed portion for avoiding interference with part of the trigger driving device 45. In the example depicted in the drawing, the body frame 43 has an opening 43c (refer to FIG. 7). The trigger driving device 45 has a driving source 45c at a rearmost portion thereof. The driving source 45c is fitted in the opening 43c such that it is exposed on the upper side of the body frame 43 (refer to FIG. 6A). According to this structure, it is possible to adopt a driving source of high output power for the driving source 45c.

As described hereinabove, the operation button 19 (refer to FIG. 2B) is provided on the left side face 11c of the grip 11B. As depicted in FIG. 5A, a switch 44a for detecting movement of the operation button 19 and a board 44 on which the switch 44a is mounted are arranged in front of the front edge (upper edge) 42a of the second circuit board 42. Since the second circuit board 42 and the board 44 do not overlap as viewed in side elevation in such a manner, making the grip 11B thicker than necessary can be avoided. The location of the board 44 is not limited to that in the example depicted in FIG. 5A. For example, the board 44 may overlap the second circuit board 42 as viewed in side elevation of the internal structure S1.

[Structure of Operation Button]

Figure 5B:
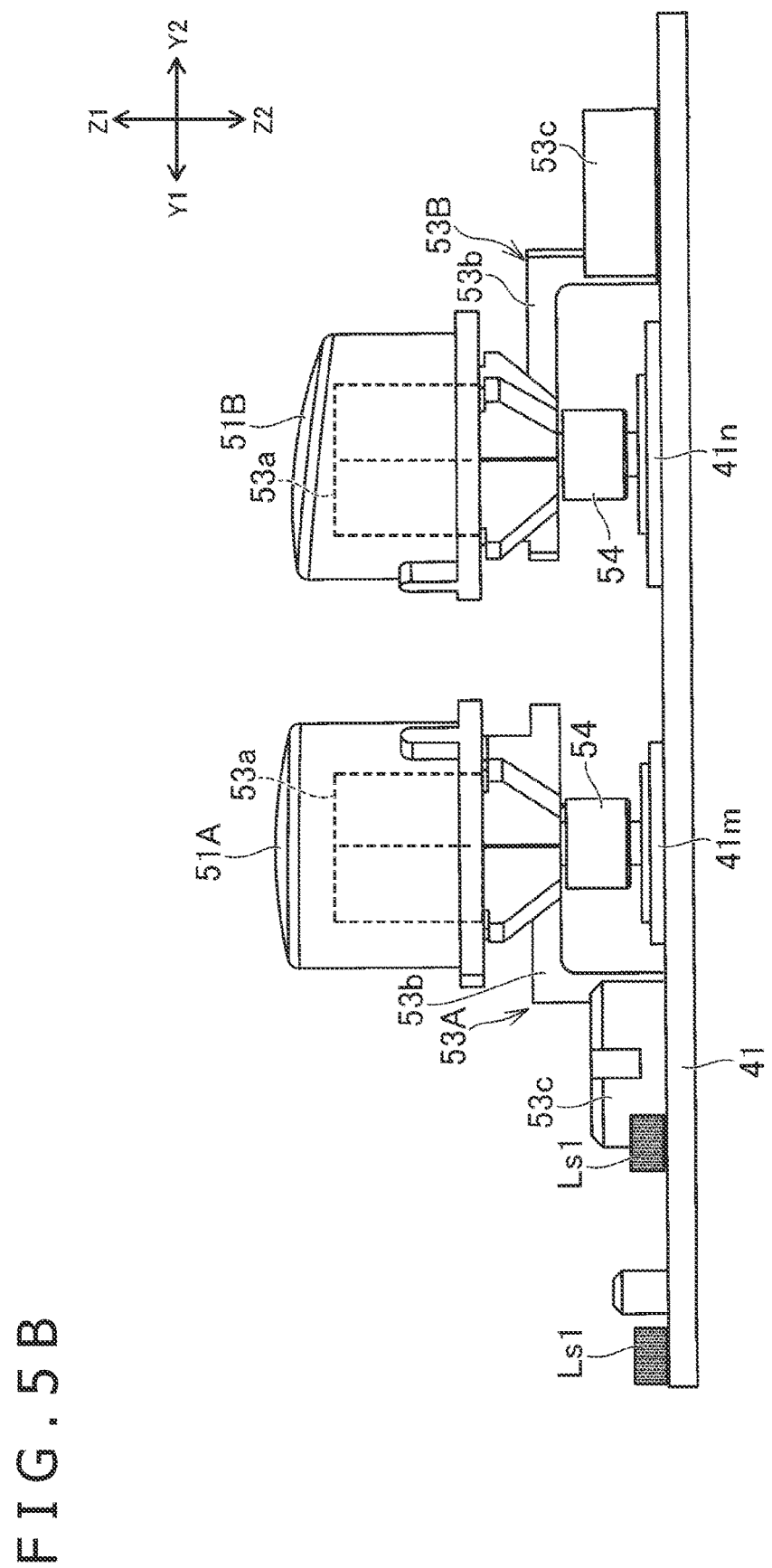
FIG. 5B is an enlarged view of a board depicted in FIG. 5A.

As depicted in FIG. 5B, the user can press the operation buttons 51A and 51B downwardly. Switches 41m and 41n for detecting a pressing operation for the operation buttons 51A and 51B, respectively, are mounted on an upper face of the first circuit board 41. The switches 41m and 41n are located below the operation buttons 51A and 51B, respectively. If any of the operation buttons 51A and 51B is pressed by the user, then it moves downwardly and pushes the switch 41m or 41n. Each of the switches 41m and 41n may be, for example, a tact switch or a membrane switch.

Further, the operation buttons 51A and 51B have provided therefor a touch sensor function for detecting that a finger has touched (or come near to) to the operation buttons 51A and 51B. The inputting device 100 detects, before the user presses the operation button 51A or 51B, that a finger is placed on the upper face of the operation button 51A or 51B and transmits a signal representing that to an information processing device (for example, an information processing device built in the HMD 2). If the information processing device detects that a finger is placed on the upper face of the operation button 51A or 51B, then it reflects this on the progress of the game. The information processing device causes, for example, a game character to take a predetermined posture for preparation.

For the purpose of implementing the touch sensor function, the operation buttons 51A and 51B have detection conductors 53A and 53B (refer to FIGS. 5B and 6B) provided thereon, respectively. Meanwhile, conductor pads 41s and 41t (refer to FIG. 6B) are formed on the first circuit board 41. The detection conductors 53A and 53B are electrically connected to the conductor pads 41s and 41t, respectively. A touch sensor integrated circuit (IC) (not depicted) is mounted on the first circuit board 41. If a finger of the user touches the operation button 51A or 51B, then the capacitance of the detection conductor 53A or 53B and circuit patterns connected to it (including the conductor pad 41s or 41t) changes. The touch sensor IC detects the change in the capacitance and outputs a signal indicating that a finger of the user has touched or come near to the operation button 51A or 51B.

Figure 6A:
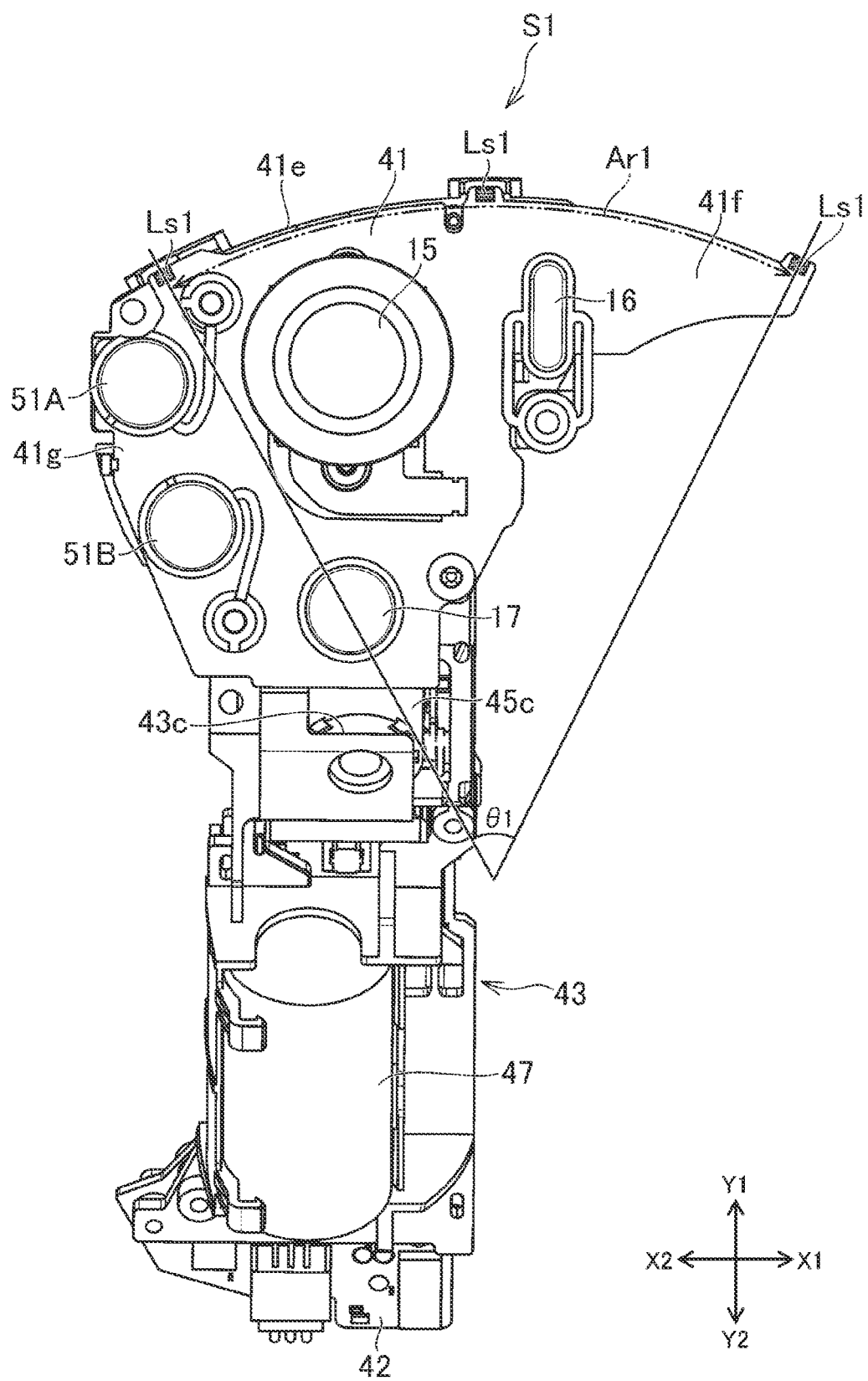
FIG. 6A is a top plan view of the internal structure accommodated in the main body.
Figure 6B:
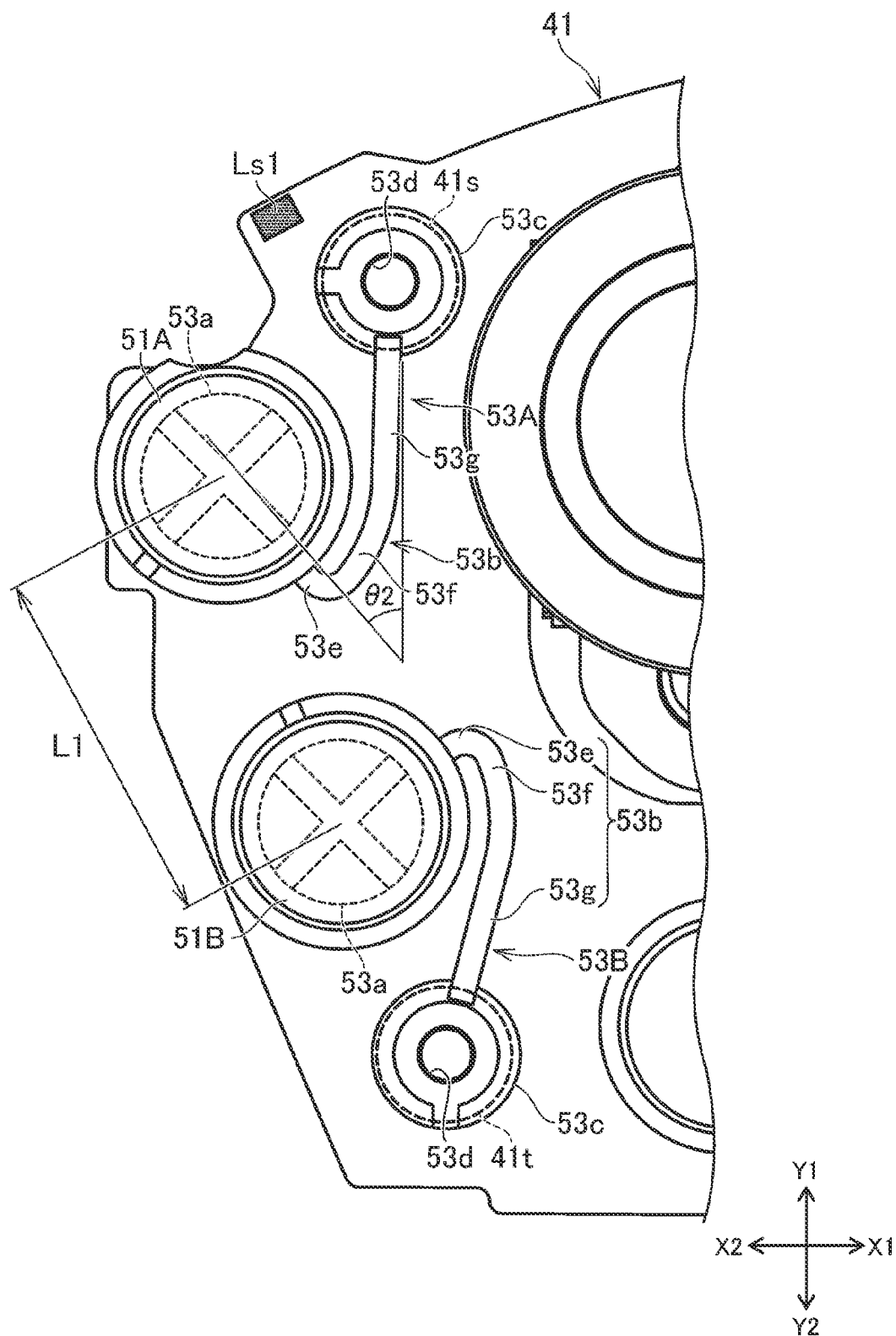
FIG. 6B is an enlarged view of operation buttons depicted in FIG. 6A.

As depicted in FIG. 6B, the conductor pads 41s and 41t are located on the outside of the external shape of the operation buttons 51A and 51B when the operation buttons 51A and 51B are viewed in top plan, respectively. In other words, the conductor pads 41s and 41t are not located below the operation buttons 51A and 51B, respectively. In the example depicted in FIG. 6B, the location of the conductor pad 41s is spaced to the right side and the front side away from the operation button 51A, and the location of the conductor pad 41t is spaced to the rear side away from the operation button 51B. Each of the detection conductors 53A and 53B has a movable portion 53a (refer to FIG. 5B) attached to the operation button 51A or 51B and an elastic portion 53b extending from the movable portion 53a (refer to FIG. 6B) in a direction intersecting with the upward and downward direction. Further, each of the detection conductors 53A and 53B has a fixation portion 53c (refer to FIG. 6B) connected to the elastic portion 53b and attached to the conductor pad 41s or 41t. Elastic deformation of the elastic portion 53b permits movement of the movable portion 53a in the upward and downward direction.

In this structure, since the conductor pads 41s and 41t are not located below the operation buttons 51A and 51B, the distances between the operation buttons 51A and 51B and the first circuit board 41 can be made small. Further, the elastic portion 53b functions as a spring such that elastic force thereof can compensate for reactive force to be generated when the operation button 51A or 51B is pressed. The reactive force against the pressing operation of the operation button 51A or 51B may be the sum of the elastic force of the elastic portion 53b, the elastic force of a buffering-shaped portion 54 hereinafter described, and the reactive force of the switch 41m or 41n.

The fixation portion 53c may be attached to the first circuit board 41, for example, by a screw (not depicted). In the example depicted in FIG. 6B, a hole 53d into which a screw is to be fitted is formed in the fixation portion 53c as depicted in FIG. 6B. By attaching the fixation portion 53c to the first circuit board 41 with use of a screw, electric connection between the fixation portion 53c and the conductor pad 41s or 41t can be secured, and also mechanical strength in attachment of them can be assured. The screw may be inserted into the hole 53d of the fixation portion 53c and a hole formed in the first circuit board 41 and be fixed to a threaded hole formed in the body frame 43.

The exterior member 62 (refer to FIG. 3) that covers the upper side of the internal structure S1 may have, on an inner face thereof, a pillar portion (not depicted) that supports the exterior member 62. A lower end of the pillar portion may be located on the fixation portion 53c and fitted with the fixation portion 53c. This can suppress deflection or depressing of the exterior member 62 when the inputting device 100 is used.

The operation buttons 51A and 51B are insulators and are, for example, formed from a resin material such as polycarbonate, polyamide, polybutylene terephthalate, or an acrylonitrile-butadiene styrene (ABS) resin. The material for the detection conductors 53A and 53B may be, for example, a conductive resin. In particular, the material for the detection conductors 53A and 53B may be a nylon resin containing a conductive material, a polyetheretherketone resin (PEEK resin) containing a conductive material, or a polyacetal resin (POM resin) containing a conductive material. The material for the detection conductors 53A and 53B may be metal such as copper, copper alloy, stainless steel, or aluminum. The movable portion 53a, the elastic portion 53b, and the fixation portion 53c may be formed integrally with one another from a conductive resin or metal. In a case where the material for the detection conductors 53A and 53B is metal, the fixation portion 53c may be soldered to each of the conductor pads 41s and 41t.

As depicted in FIG. 5B, the operation buttons 51A and 51B may be formed so as to cover an upper portion of the movable portions 53a. The detection conductors 53A and 53B and the operation buttons 51A and 51B may be formed by insert molding. In particular, at the molding step of the operation buttons 51A and 51B, the movable portion 53a may be placed in the inside of a metal mold, and then, molten resin of the material for the operation buttons 51A and 51B may be supplied into the metal mold. The operation buttons 51A and 51B may otherwise be molded separately from the movable portions 53a. In this case, a recessed portion may be formed on the inner side of each of the operation buttons 51A and 51B such that the movable portion 53a is fitted into the recessed portion to fix the operation button 51A or 51B and the movable portion 53a to each other.

As depicted in FIG. 5B, a lower portion of the movable portion 53a may project downwardly from each of the operation buttons 51A and 51B. The buffering-shaped portion 54 formed from an elastic material (for example, rubber) may be attached to a lower end of the movable portion 53a.

As depicted in FIG. 6B, each of the detection conductors 53A and 53B has only one elastic portion 53b, and the elastic portion 53b is connected to one side of the movable portion 53a. Each of the detection conductors 53A and 53B does not have, on the side opposite to the elastic portion 53b, a portion that supports the movable portion 53a. In other words, each of the detection conductors 53A and 53B has a cantilever structure. This can reduce the area to be used for arranging the operation buttons 51A and 51B and the detection conductors 53A and 53B.

As depicted in FIG. 6B, the elastic portions 53b of the detection conductors 53A and 53B may be arranged on the same side with respect to the operation buttons 51A and 51B. In the example depicted in FIG. 6B, the operation buttons 51A and 51B are arranged at a leftmost portion of the first circuit board 41, and the elastic portions 53b of the detection conductors 53A and 53B are arranged on the right side with respect to the operation buttons 51A and 51B.

As depicted in FIG. 6B, the elastic portion 53b is curved as viewed in top plan. In particular, the elastic portion 53b has a first extension portion 53e, a curved portion 53f, and a second extension portion 53g. The first extension portion 53e extends in a radial direction of each of the operation buttons 51A and 51B from the movable portion 53a. The curved portion 53f is connected to the first extension portion 53e. The curved portion 53f further extends from the first extension portion 53e while being curved. The second extension portion 53g further extends from the curved portion 53f. By forming the elastic portion 53b in a curved form in such a manner, reserving the length of the elastic portion 53b is facilitated. As a result, securing a movable range of the movable portion 53a in the upward and downward direction is also facilitated.

As depicted in FIG. 6B, the angle θ2 between the first extension portion 53e and the second extension portion 53g is smaller than 90 degrees. By forming the elastic portion 53b in a greatly curved state in such a manner, the linear distance between each of the operation buttons 51A and 51B and the fixation portion 53c can be made small. As a result, the area to be used for arranging the detection conductors 53A and 53B and the operation buttons 51A and 51B can be reduced.

The shape of the elastic portion 53b is not limited to that of the example depicted in FIG. 6B. For example, the curved portion 53f and the second extension portion 53g may be generally curved such that they surround the outer periphery of the operation buttons 51A and 51B as viewed in top plan. In other words, the elastic portion 53b may not have the second extension portion 53g. Further, the angle θ2 between the first extension portion 53e and the second extension portion 53g may be 90 degrees or greater than 90 degrees.

As depicted in FIG. 6B, the distance between the conductor pad 41s to which the detection conductor 53A is connected and the conductor pad 41t to which the detection conductor 53B is connected is greater than a distance L1 between the operation button 51A and the operation button 51B. According to this structure, while the distance L1 between the operation buttons 51A and 51B is kept appropriate, the length of the elastic portion 53b of the detection conductors 53A and 53B can be reserved.

As depicted in FIG. 6B, the first extension portions 53e included in the two detection conductors 53A and 53B may extend in directions different from each other. In particular, the first extension portion 53e included in the detection conductor 53A extends obliquely rearwardly and rightwardly from the movable portion 53a. In contrast, the first extension portion 53e included in the detection conductor 53B extends obliquely rightwardly and forwardly from the movable portion 53a.

Further, as depicted in FIG. 6B, also the second extension portions 53g included in the two detection conductors 53A and 53B may extend in directions different from each other. In particular, the second extension portion 53g included in the detection conductor 53A extends substantially forwardly. In contrast, the second extension portion 53g included in the detection conductor 53B extends substantially rearwardly. By such shapes of the two detection conductors 53A and 53B, the distance between the conductor pads 41s and 41t (in other words, between the fixation portions 53c) can be increased. As a result, the length of the elastic portion 53b can be reserved.

Also the switches for detecting a pressing operation for the operation buttons 16 and 17 may be mounted on an upper face of the first circuit board 41. Also the operation buttons 16 and 17 may be provided with a touch sensor function. In this case, a detection conductor is provided also on the operation buttons 16 and 17.

Further, a support mechanism (not depicted) for supporting the operation stick 15 may be arranged on the upper face of the first circuit board 41. As depicted in FIG. 7, the operation stick 15 has an upper portion 15a of a disk shape to be touched by a finger of the user and a skirt 15b that is formed at a lower portion of the operation stick 15 and has an umbrella shape. The support mechanism is arranged on the lower side of the skirt 15b and is covered with the skirt 15b. Also the operation stick 15 may have a touch sensor function provided therefor. In this case, a detection conductor may be provided also on the operation stick 15.

[Arrangement of Light Source at Front Portion]

As described hereinabove, a plurality of light emitting portions H for tracking are provided on the outer face of the inputting device 100. As depicted in FIG. 2D, the plurality of light emitting portions H are provided on the front face 11b of the operation portion 11A and the front face 30b of the side portion 30 such that they are lined up in the leftward and rightward direction.

As depicted in FIGS. 2A to 2C, the plurality of light emitting portions H are provided on the ring-shaped portion 20 such that they are lined up along an arc or a ring centered at the center line Pc. In the example depicted in FIGS. 2A to 2C, the light emitting portions H on the ring-shaped portion 20 are arranged over 360 degrees in a direction of a circumference centered at the center line Pc.

As depicted in FIG. 2B, the ring-shaped portion 20 has a rear inclined face 20a located at a rear portion of the ring-shaped portion 20 and inclined toward the center line Pc and a front inclined face 20b located at a front portion of the ring-shaped portion 20 and inclined toward the center line Pc. The light emitting portions H are lined up along circular rings centered at the center line Pc on the rear inclined face 20a and the front inclined face 20b. In other words, the light emitting portions H are lined up in two rows on the ring-shaped portion 20.

As depicted in FIGS. 2A to 2C, the light emitting portions H arranged on the front face 11b of the operation portion 11A and the front face 30b of the side portion 30 and the light emitting portions H arranged along the rear inclined face 20a may be located on a common virtual spherical surface Sr. According to this arrangement of the light emitting portions H, the load of a calculation process for the position and the posture of the inputting device 100 based on the locations of the light emitting portions H detected through the camera can be reduced. The front face 11b of the operation portion 11A, the front face 30b of the side portion 30, and the rear inclined face 20a on which the light emitting portions H are arranged may be curved faces that configure part of the virtual spherical surface Sr.

As depicted in FIG. 6A, a plurality of light sources Ls1 are mounted on the first circuit board 41. The light sources Ls1 are light sources for the light emitting portions H arranged on the front face 11b of the operation portion 11A and the front face 30b of the side portion 30. The locations of the light sources Ls1 correspond to the locations of the light emitting portions H. The light sources Ls1 are lined up along an arc Ar1 having the center angle θ1. Since the light sources Ls1 are mounted on the first circuit board 41 on which the switches 41m and 41n and so forth are mounted, increase of the number of parts for the light sources Ls1 can be prevented, and an assembly work of the inputting device 100 can be facilitated.

As depicted in FIG. 6A, a front edge 41e of the first circuit board 41 is curved along the arc Ar1. The light sources Ls1 are arranged on the front edge 41e. Each of the light sources Ls1 is, for example, a light emitting diode (LED). The light sources Ls1 are mounted on the first circuit board 41 in such a posture that they emit light forwardly.

The exterior member 62 has a front wall 62a (refer to FIG. 3) formed along the front edge 41e of the first circuit board 41. The front wall 62a may have, at positions thereof corresponding to the light sources Ls1, openings or notches for passing light of the light sources Ls1 therethrough. According to this structure, the direction in which light is to be emitted from each light source Ls1 can be controlled.

The inputting device 100 includes an exterior member 65 (refer to FIG. 3) that configures the front face 11b of the operation portion 11A and the front face 30b of the side portion 30. The light sources Ls1 are covered on the front side thereof with the exterior member 65. The exterior member 65 may be formed, for example, from a material having a light transmission property on the whole. Alternatively, the exterior member 65 may be coated with a coating material for light blocking while the coating material is not applied to only the positions of the light sources Ls1.

As depicted in FIG. 5A, the front edge 41e of the first circuit board 41 passes a position in front of the front face of the trigger button 18. That one of the plural light sources Ls1 which is located frontmost is located in front of the front face of the trigger button 18. According to this arrangement of the light sources Ls1 and the trigger button 18, the frequency in which a finger placed on the trigger button 18 intercepts the light of the light sources Ls1 can be reduced. It is to be noted that not only the light source Ls1 located frontmost but also a plurality of light sources Ls1 lined up along the front edge 41e of the first circuit board 41 may be located in front of the front face of the trigger button 18.

As depicted in FIGS. 2A and 6A, the first circuit board 41 has a projection 41f that swells rightwardly farther than a right side face 11d of the grip 11B. The projection 41f is located in the inside of the side portion 30. According to this shape of the first circuit board 41, the degree of freedom in number and arrangement of the light sources Ls1 can be increased. In the example depicted in FIGS. 2A and 6A, the light source Ls1 that is located rightmost is mounted at the right end of the projection 41f. Alternatively, a plurality of light sources Ls1 may be mounted on the projection 41f.

A plurality of operation members (particularly, the operation buttons 51A, 51B, 16, and 17 and the operation stick 15) are provided on the operation portion 11A. The projection 41f of the first circuit board 41 projects rightwardly farther than the operation member located on the rightmost. Further, the light source Ls1 located rightmost is located further on the right side with respect to the operation member. In the example depicted in FIGS. 2A and 6A, the light source Ls1 is located on the right side with respect to the operation button 16.

The first circuit board 41 has a portion 41g that swells leftwardly farther than the left side face 11c (refer to FIG. 2A) of the grip 11B. According to this shape of the first circuit board 41, the degree of freedom in number and arrangement of the light sources Ls1 can be further increased. In the example depicted in FIGS. 2A and 6A, the light source Ls1 that is located on the leftmost is mounted on the portion 41g. The light source Ls1 located on the leftmost is located leftwardly farther than the left side face 11c of the grip 11B.

[Internal Structure of Ring-Shaped Portion and Arrangement of Light Sources]

As depicted in FIG. 3, the inputting device 100 has an internal structure S2 arranged on the ring-shaped portion 20. The internal structure S2 is accommodated in exterior members 63 and 64 that form the ring-shaped portion 20. The internal structure S2 has flexible boards 21A and 21B. Light sources Ls2 (refer to FIG. 4) are mounted also on the flexible boards 21A and 21B. The light sources Ls2 are light sources for the light emitting portions H arranged on the outer face (inclined faces 20a and 20b) of the ring-shaped portion 20, and the locations of the light sources Ls2 correspond to the locations of the light emitting portions H. Each of the light sources Ls2 particularly is an LED.

By using the flexible boards 21A and 21B at a rear portion of the inputting device 100, the degree of freedom in arrangement of the light sources Ls2 can be increased. In particular, the light sources Ls2 of the flexible boards 21A and 21B are lined up along an arc or a circular ring having a center angle greater than the center angle θ1 (refer to FIG. 6A) of the arc Ar1 on which the light sources Ls1 of the first circuit board 41 are arranged. In the example depicted in the drawing, the light sources Ls2 are lined up over 360 degrees along a circular ring centered at the center line Pc (refer to FIGS. 2A and 2C). The flexible boards 21A and 21B are curved along the circular ring.

As depicted in FIG. 3, the internal structure S2 may include a frame 22. The frame 22 has a ring shape and is curved along a circular ring (or an arc) centered at the center line Pc. The flexible boards 21A and 21B are attached to the outer side of the frame 22. According to this structure, the assembly work of the inputting device 100 can be facilitated.

As depicted in FIG. 3, the exterior member 63 configures an inner face 20c of the ring-shaped portion 20. The exterior member 64 configures an outer circumferential face (inclined faces 20a and 20b) of the ring-shaped portion 20. The frame 22 is arranged between the exterior member 63 and the exterior member 64. The exterior member 64 may be formed, for example, from a material having a light transmission property on the whole. Alternatively, the exterior member 64 may be coated with a coating material for light blocking while the coating material is not applied to only the positions of the light sources Ls2.

If the frame 22 is used, locating the light sources Ls2 nearer to the inner face of the exterior member 64 configuring the outer face of the ring-shaped portion 20 is facilitated. Further, the exterior member 63 configuring the inner face 20c of the ring-shaped portion 20 does not require a structure for fixing the flexible boards 21A and 21B. Thus, the shape of the exterior member 63 can be simplified, and the inner face 20c of the ring-shaped portion 20 can be made smooth.

Figure 4:
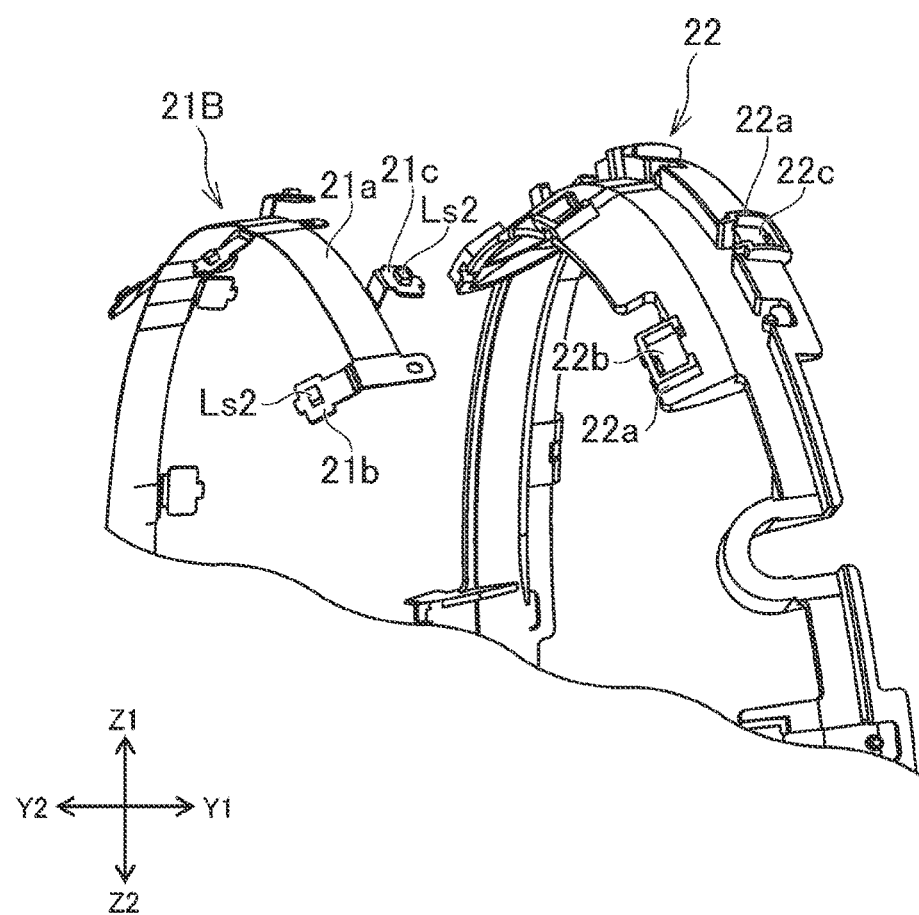
FIG. 4 is a perspective view depicting a frame and a flexible board arranged at a ring-shaped portion of the inputting device.

As depicted in FIG. 4, each of the flexible boards 21A and 21B has a main extension portion 21a extending along an arc (or a circular ring) centered at the center line Pc, a rear projection 21b projecting rearwardly from the main extension portion 21a, and a front projection 21c projecting forwardly from the main extension portion 21a. The light sources Ls2 are mounted on the projections 21b and 21c. The light sources Ls2 mounted on the rear projections 21b are light sources for the light emitting portions H on the rear inclined face 20a, and the light sources Ls2 mounted on the front projections 21c are light sources for the light emitting portions H on the front inclined face 20b.

Figure 8:
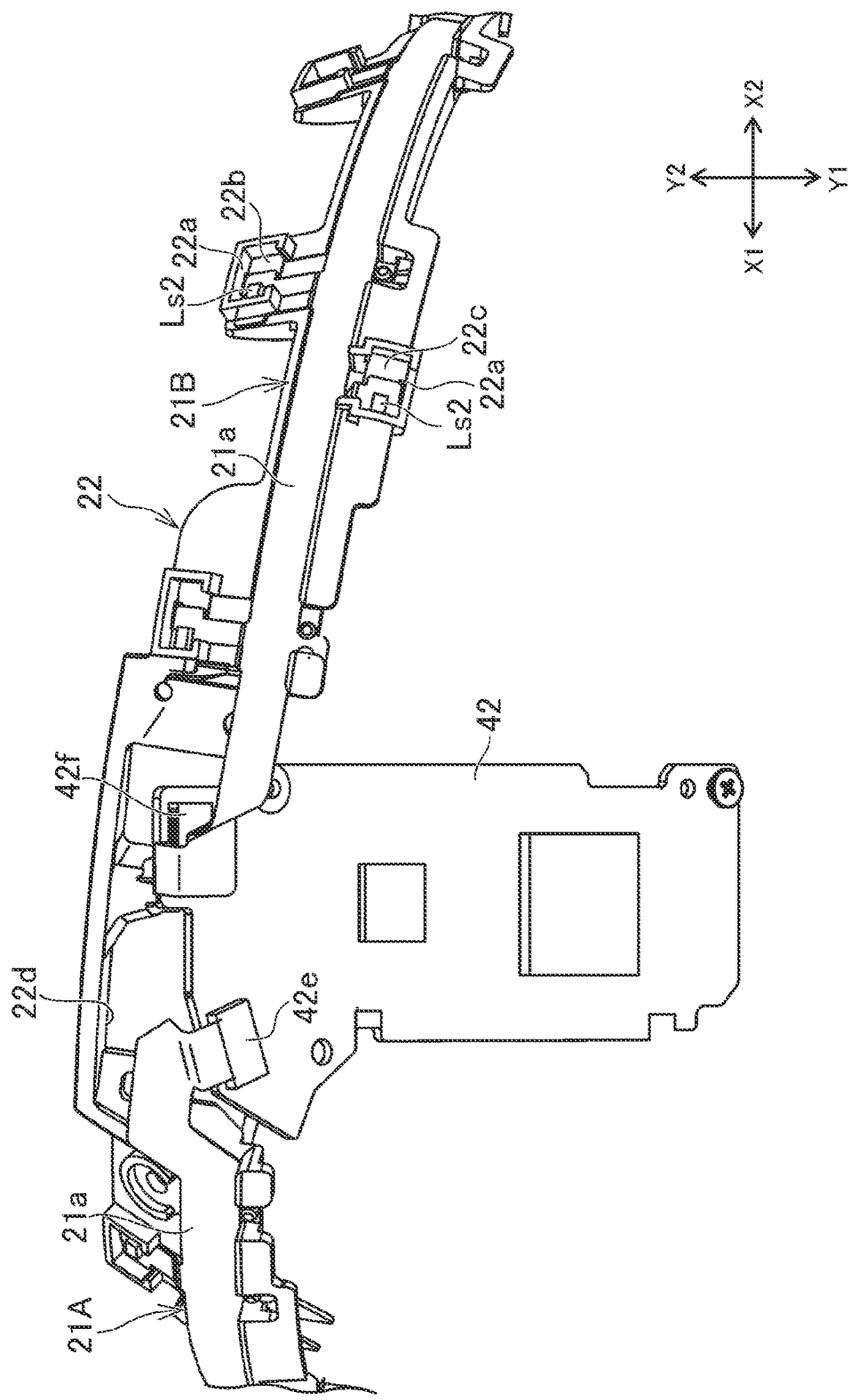
FIG. 8 is a bottom plan view of a second circuit board, a frame, and the flexible board depicted in FIG. 3.

As depicted in FIGS. 4 and 8, the frame 22 has light shielding walls 22a that surround each of the light sources Ls2. According to this, the range to which light of the light sources Ls2 (light of the light emitting portions H) spreads can be restricted by the light shielding wall 22a. Accordingly, when light of the light emitting portions H is to be captured by the camera of the HMD 2, rays of light of two light emitting portions H adjacent to each other can be suppressed from overlapping with one another. As a result, the detection accuracy of the position and the posture of the inputting device 100 can be improved. It is to be noted that a plurality of recessed portions may be formed on the frame 22 in place of or together with the light shielding walls 22a. Further, the light sources Ls2 may be arranged on the inner side of the recessed portions. In this case, the range to which light of the light sources Ls2 (light of the light emitting portions H) spreads can be restricted by the inner face of the recessed portions.

As depicted in FIG. 4, the frame 22 has formed thereon rear supporting faces 22b on which the rear projections 21b of the flexible boards 21A and 21B are arranged and front supporting faces 22c on which the front projections 21c are arranged. The angle of the rear supporting face 22b and the angle of the front supporting face 22c are different from each other. In particular, the rear supporting face 22b is inclined along the rear inclined face 20a of the ring-shaped portion 20, and the front supporting face 22c is inclined along the front inclined face 20b of the ring-shaped portion 20. According to this structure of the frame 22, the direction to which light of each light source Ls2 is to be emitted can be controlled. As a result, the detection accuracy of the position and the posture of the inputting device 100 can be improved.

The internal structure S2 of the ring-shaped portion 20 includes a light shielding member 23 (refer to FIG. 3). The light shielding member 23 is attached to the flexible boards 21A and 21B and the frame 22 such that it surrounds the outer side of the main extension portions 21a of the flexible boards 21A and 21B. Further, the light shielding member 23 extends between the light sources Ls2 mounted on the rear projection 21b and the light sources Ls2 mounted on the front projection 21c. By the light shielding member 23, when light of the light emitting portions H is to be captured by the camera of the HMD 2, overlap of rays of light of two light emitting portions H adjacent to each other (rays of light from a light source Ls2 of the rear projection 21b and a light source Ls2 of the front projection 21c) can be suppressed in an efficient manner. As a result, the detection accuracy of the position and the posture of the inputting device 100 can be further improved.

The light shielding member 23 may be formed from an elastic material such as rubber. Further, the light shielding member 23 may be sandwiched by and between the inner face of the exterior member 64 and the main extension portions 21a of the flexible boards 21A and 21B. In other words, the light shielding member 23 may be held in contact with the inner face of the exterior member 64. According to this structure, overlap of rays of light of two light emitting portions H adjacent to each other (rays of light from a light source Ls2 of the rear projection 21b and a light source Ls2 of the front projection 21c) can be suppressed more efficiently.

The frame 22 has a ring shape surrounding the center line Pc over 360 degrees. By this, the strength of the frame 22 can be improved. As depicted in FIG. 8, the flexible boards 21A and 21B are connected to connectors 42e and 42f mounted at a rear portion (lower portion) of the second circuit board 42, respectively.

As depicted in FIG. 8, a recessed portion 22d is formed at a lower portion of the frame 22. A rear portion (lower portion) of the second circuit board 42 is located on the inner side of the recessed portion 22d. Consequently, the relative positions of the ring-shaped portion 20 and the grip 11B can be made appropriate.

The inputting device 100 may have, at a rear portion thereof, an arcuate portion (a portion surrounding the center line Pc over an angle smaller than 360 degrees) in place of the ring-shaped portion 20 that surrounds the center line Pc over 360 degrees. In this case, the light emitting portions H arranged on the arcuate portion (in other words, the light sources Ls2) may be lined up along an arc centered at the center line Pc. Also in this case, the center angle of the arc may be greater than the center angle of the arc Ar1 along which the light sources Ls1 mounted on the first circuit board 41 are lined up.

CONCLUSION

As described so far, the inputting device 100 includes the operation buttons 51A and 51B, the switches 41m and 41n that are located below the operation buttons 51A and 51B and are pushed by the operation buttons 51A and 51B, the first circuit board 41 including the conductor pads 41s and 41t located on the outside with respect to the external shape of the operation buttons 51A and 51B when the operation buttons 51A and 51B are viewed in the upward and downward direction, and the detection conductors 53A and 53B provided on the operation buttons 51A and 51B. Each of the detection conductors 53A and 53B includes the movable portion 53a attached to the operation button 51A or 51B, the elastic portion 53b extending from the movable portion 53a in a direction intersecting with the upward and downward direction, and the fixation portion 53c connected to the elastic portion 53b and attached to the conductor pad 41s or 41t, and movement of the movable portion 53a in the downward direction is permitted by elastic deformation of the elastic portion 53b. According to this structure, a finger touching or coming near to the surface of the operation button can be detected. Further, since the conductor pads 41s and 41t are not located below the operation buttons 51A and 51B, the distances between the operation buttons 51A and 51B and the first circuit board 41 can be made small. Further, the elastic portion 53b functions as a spring and can compensate, by the elastic force thereof, for the reactive force that is to be generated when the operation button 51A or 51B is pressed.

Further, in the inputting device 100, the operation portion 11A has the operation buttons 51A, 51B, 16, and 17 and the first circuit board 41 arranged along the plane P4. Meanwhile, the grip 11B includes the second circuit board 42 that is arranged obliquely with respect to the plane P4 and that extends obliquely rearwardly from the operation portion 11A. To the body frame 43, the first circuit board 41 and the second circuit board 42 are attached. The trigger button 18 is arranged below the first circuit board 41 and located in front of an upper portion of the second circuit board 42.

Further, in the inputting device 100, the front edge (upper edge) 42a of the second circuit board 42 is located lower than the first circuit board 41. The vibration motor 47 is arranged on the upper side of the second circuit board 42 and accommodated in the grip 11B. According to this structure, adoption of a motor having high output power for the vibration motor 47 is facilitated. Further, a large space is assured below the first circuit board 41 and in front of the second circuit board 42, and various parts can be arranged also in the space. In the inputting device 100, the trigger driving device 45 is arranged below the first circuit board 41 and in front of the second circuit board 42. Different from the inputting device 100, the battery 48 may be arranged on the upper side of the second circuit board 42 and accommodated in the grip 11B. In this case, adoption of a battery having a great charging capacity for the battery 48 is facilitated.

Further, in the inputting device 100, the operation portion 11A includes at least one operation member (51A, 51B, 16, or 17) and the first circuit board 41 on which the switch (41m or 41n) for detecting movement of the at least one operation member is arranged. The plurality of light sources Ls1 for tracking are mounted on the first circuit board 41 and are lined up along the arc Ar1 (refer to FIG. 6A) having the center angle θ1. The plurality of light sources Ls2 for tracking are lined up along the arc or the circular ring having a center angle greater than the center angle θ1. The light sources Ls2 are mounted on the flexible boards 21A and 21B that are curved along the arc or the circular ring. According to this structure, since the light sources Ls1 are mounted on the first circuit board 41 on which the switch (41m or 41n) is mounted, it is possible to avoid increase of the number of parts. Further, since the plurality of light sources Ls2 lined up along the large arc (or circular ring) are mounted on the flexible boards 21A and 21B, it is easy to optimize the locations of the light sources Ls2.

It is to be noted that the inputting device according to the embodiment of the present disclosure is not limited to the inputting device 100 described above. For example, the shape of the inputting device 100 is not limited to that of the example described hereinabove with reference to the drawings and, for example, may not have the side portion 30. Further, the ring-shaped portion 20 may be provided not at a rear portion of the inputting device 100 but at a front portion of the inputting device 100.

It should be understood by those skilled in the art that various modifications, combinations, sub-combinations and alterations may occur depending on design requirements and other factors insofar as they are within the scope of the appended claims or the equivalents thereof.

What is claimed is:

1. An input device comprising:
an operation portion including a first operation button and a first circuit board arranged along a first plane, where a pressing direction of the first operation button defines an axial direction that is normal to the first plane and extends from above the first plane to below the first plane;
a grip that includes a second circuit board arranged along a second plane that extends obliquely and rearwardly from the operation portion, wherein a front edge of the second circuit board is arranged rearwardly from, and lower than, a rear edge of the first circuit board;
a vibration motor arranged on an upper side of the second circuit board and is accommodated in the grip; and
a battery arranged on the second circuit board, wherein the vibration motor and the battery are arranged on opposite sides across the second circuit board.

2. The input device of claim 1, further comprising:
a connector provided at a lower portion of the grip, for charging the battery, wherein
the connector is directed forwardly.

3. The input device of claim 1, further comprising:
a frame having a front portion to which the first circuit board is attached and a rear portion to which the second circuit board is attached; and
an exterior member in which the frame is accommodated.

4. The input device of claim 3, wherein the rear portion of the frame extends obliquely rearwardly downwardly from the front portion of the frame.

5. The input device of claim 1, further comprising a second operation button located below the first circuit board and in front of the second circuit board.

6. The input device of claim 5, further comprising a driving device that is located below the first circuit board and in front of the second circuit board and generates reactive force against a pressing operation of the second operation button.

7. The input device of claim 1, further comprising a switch positioned between the first circuit board and the second circuit board.

8. The input device of claim 7, wherein the switch is positioned between the rear edge of the first circuit board and the front edge of the second circuit board.

9. The input device of claim 8, wherein the switch is positioned on a board.

10. The input device of claim 9, wherein the board is positioned between the rear edge of the first circuit board and the front edge of the second circuit board.

11. The input device of claim 7, wherein the grip includes a second operation button having a second pressing direction directed to the switch.

12. The input device of claim 11, wherein the second pressing direction defines a second axial direction transverse to the axial direction.

\* \* \* \* \*